United States Patent
Wong et al.

(10) Patent No.: US 10,003,195 B1
(45) Date of Patent: Jun. 19, 2018

(54) HYBRID STATCOM WITH WIDE COMPENSATION RANGE AND LOW DC-LINK VOLTAGE

(71) Applicant: University of Macau, Macau (MO)

(72) Inventors: Man-Chung Wong, Macau (MO); Chi-Seng Lam, Macau (MO); Lei Wang, Macau (MO)

(73) Assignee: University of Macau, Macau (MO)

( * ) Notice: Subject to any disclaimer, the term of this patent is extended or adjusted under 35 U.S.C. 154(b) by 0 days. days.

(21) Appl. No.: 15/425,270

(22) Filed: Feb. 6, 2017

(51) Int. Cl.
*H02J 3/18* (2006.01)
*H02J 3/01* (2006.01)
*H02M 7/537* (2006.01)

(52) U.S. Cl.
CPC .............. *H02J 3/1842* (2013.01); *H02J 3/01* (2013.01); *H02M 7/537* (2013.01)

(58) Field of Classification Search
CPC .......... H02J 3/01; H02J 3/1842; H02M 7/537; H02M 1/4225; H02M 2001/0032; H02M 2001/0045; H02M 3/1584; G05F 1/56; G05F 1/59; G05F 1/575; Y02B 70/126
USPC ................ 323/207–210, 212–214, 268, 269; 363/71, 72
See application file for complete search history.

(56) References Cited

U.S. PATENT DOCUMENTS

| | | | | |
|---|---|---|---|---|
| 5,434,497 A * | 7/1995 | Larsen | ................... | H02J 3/1864 323/209 |
| 8,400,119 B2 * | 3/2013 | Angquist | .............. | H02J 3/1864 307/105 |
| 2013/0293021 A1 * | 11/2013 | Varma | ....................... | H02J 3/18 307/75 |

OTHER PUBLICATIONS

Design and Performance of an Adaptive Low-DC-Voltage-Controlled LC-Hybrid Active Power Filter With a Neutral Inductor in Three-Phase; Four-Wire Power Systems, Chi-Seng Lam, Member, IEEE, Man-Chung Wong, Senior Member, IEEE, Wai-Hei Choi, Student Member, IEEE, Xiao-Xi Cui, Hong-Ming Mei, and Jian-Zheng Liu.*
J. Dixon, L. Moran, J. Rodriguez, and R. Domke, "Reactive power compensation technologies: State-of-the-art review," Proc. IEEE, vol. 93, No. 12, pp. 2144-2164, Dec. 2005.

(Continued)

*Primary Examiner* — Yemane Mehari
(74) *Attorney, Agent, or Firm* — Spruson & Ferguson (Hong Kong) Limited

(57) ABSTRACT

A hybrid-STATCOM for providing compensating reactive power required by a load, the hybrid-STATCOM comprising: a TCLC part for each electric power phase, each TCLC part comprising: a coupling inductor; a power filter capacitor; and a thyristor-controlled reactor connected in series with a power filter inductor; and an active inverter part comprising: a voltage source inverter for each electric power phase; and a DC-link capacitor connected in parallel with the voltage source inverters. The control strategy of the hybrid-STATCOM is separated into two parts: TCLC part control and Active inverter part control. The TCLC part control is based on the instantaneous pq theory and aims to compensate the loading reactive power with the controllable TCLC part impedance. The active inverter part control is based on the instantaneous active and reactive current $i_d$-$i_q$ method and aims to improve the overall performance of the hybrid-STATCOM under different voltage and current conditions.

14 Claims, 12 Drawing Sheets

(56) References Cited

OTHER PUBLICATIONS

L. Gyugyi, R. A. Otto, and T. H. Putman, "Principles and applications of static thyristor-controlled shunt compensators," IEEE Trans. Power App. Syst., vol. PAS-97, No. 5, pp. 1935-1945, Sep./Oct. 1978.

T. J. Dionise, "Assessing the performance of a static var compensator for an electric arc furnace," IEEE Trans. Ind. Appl., vol. 50, No. 3, pp. 1619-1629, Jun. 2014.

F. Z. Peng and J. S. Lai, "Generalized instantaneous reactive power theory for three-phase power systems," IEEE Trans. Instrum. Meas., vol. 45, No. 1, pp. 293-297, Feb. 1996.

L. K. Haw, M. S. Dahidah, and H. A. F. Almurib, "A new reactive current reference algorithm for the STATCOM system based on cascaded multilevel inverters," IEEE Trans. Power Electron., vol. 30, No. 7, pp. 3577-3588, Jul. 2015.

J. A. Munoz, J. R. Espinoza, C. R. Baler, L. A. Moran, J. I. Guzman, and V. M. Cardenas, "Decoupled and modular harmonic compensation for multilevel STATCOMs," IEEE Trans. Ind. Electron., vol. 61, No. 6, pp. 2743-2753, Jun. 2014.

V. Soares and P. Verdelho, "An instantaneous active and reactive current component method for active filters," IEEE Trans. Power Electron., vol. 15, No. 4, pp. 660-669, Jul. 2000.

M. Hagiwara, R. Maeda, and H. Akagi, "Negative-sequence reactive-power control by a PWM STATCOM based on a modular multilevel cascade converter (MMCC-SDBC)," IEEE Trans. Ind. Appl., vol. 48, No. 2, pp. 720-729, 2012.

B. Singh and S. R. Arya, "Back-propagation control algorithm for power quality improvement using DSTATCOM," IEEE Trans. Ind. Electron., vol. 61, No. 3, pp. 1204-1212, Mar. 2014.

M.-C.Wong, C.-S. Lam, and N.-Y. Dai, "Capacitive-coupling STATCOM and its control," Chinese Patent for Invention, Granted, No. 200710196710.6, May 2011.

C.-S. Lam, M.-C. Wong, W.-H. Choi, X.-X. Cui, H.-M. Mei, and J.-Z. Liu, "Design and performance of an adaptive low-dc-voltage-controlled LC-Hybrid active power filter with a neutral inductor in three-phase four-wire power systems," IEEE Trans. Ind. Electron., vol. 61, No. 6 pp. 2635-2647, Jun. 2014.

S. Rahmani, A. Hamadi, N. Mendalek, and K. Ai-Haddad, "A new control technique for three-phase shunt hybrid power filter," IEEE Trans. Ind. Electron., vol. 56, No. 8, pp. 2904-2915, Aug. 2009.

S. Rahmani, A. Hamadi, and K. Ai-Haddad, "A Lyapunov-function-based control for a three-phase shunt hybrid active filter," IEEE Trans. Ind. Electron., vol. 59, No. 3, pp. 1418-1429, Mar. 2012.

H. Akagi and K. Isozaki, "A hybrid active filter for a three-phase 12-pulse diode rectifier used as the front end of a medium-voltage motor drive," IEEE Trans. Power Electron., vol. 27, No. 1, pp. 69-77, Jan. 2012.

C. Kumar and M. Mishra, "An improved hybrid DSATCOM topology to compensate reactive and nonlinear loads," IEEE Trans. Ind. Electron., vol. 61, No. 12, pp. 6517-6527, Dec. 2014.

J. He, Y. W. Y Li, and F. Blaabjerg, "Flexible microgrid power quality enhancement using adaptive hybrid voltage and current controller," IEEE Trans. Ind. Electron, vol. 61, No. 6, pp. 2784-2794, Jun. 2014.

S. Hu, Z. Zhang, Y. Chen, et al. "A new integrated hybrid power quality control system for electrical railway," IEEE Trans. Ind. Electron., vol. 62, No. 10, pp. 6222-6232, Oct. 2015.

K-W. Lao, M-C. Wong, N. Y. Dai, C-K. Wong, and C-S. Lam, "A systematic approach to hybrid railway power conditioner design with harmonic compensation," IEEE Trans. Ind. Electron., vol. 62, No. 2, pp. 930-942, Feb. 2015.

K.-W. Lao, N. Dai, W.-G.Liu, and M.-C. Wong, "Hybrid power quality compensator with minimum DC operation voltage design for high-speed traction power systems," IEEE Trans. Power Electron., vol. 28, No. 4, pp. 2024-2036, Apr. 2013.

A. Varschavsky, J. Dixon, M. Rotella, and L. Moran, "Cascaded nine-level inverter for hybrid-series active power filter, using industrial controller," IEEE Trans. Ind. Electron., vol. 57, No. 8, pp. 2761-2767, Aug. 2010.

S. P. Litran and P. Salmeron, "Reference voltage optimization of a hybrid filter for nonlinear load reference," IEEE Trans. Ind. Electron., vol. 61, No. 6, pp. 2648-2654, Jun. 2014.

J. Dixon, Y. del Valle, M. Orchard, M. Ortuzar, L. Moran, and C. Maffrand, "A full compensating system for general loads, based on a combination of thyristor binary compensator, and a PWM-IGBT active power filter," IEEE Trans. Ind. Electron., vol. 50, No. 5, pp. 982-989, Oct. 2003.

IEEE recommended practices and requirements for harmonic control in electrical power systems, 2014, IEEE Standard 519-2014.

\* cited by examiner

HYBRID STATCOM WITH WIDE COMPENSATION RANGE AND LOW DC-LINK VOLTAGE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to electricity generation and distribution.

BACKGROUND

List of References

The following references are cited in the specification. Disclosures of these references are incorporated herein by reference in their entirety.
[1] J. Dixon, L. Moran, J. Rodriguez, and R. Domke, "Reactive power compensation technologies: State-of-the-art review," Proc. IEEE, vol. 93, no. 12, pp. 2144-2164, December 2005.
[2] L. Gyugyi, R. A. Otto, and T. H. Putman, "Principles and applications of static thyristor-controlled shunt compensators," IEEE Trans. Power App. Syst., vol. PAS-97, no. 5, pp. 1935-1945, September/October 1978.
[3] T. J. Dionise, "Assessing the performance of a static var compensator for an electric arc furnace," IEEE Trans. Ind. Appl., vol. 50, no. 3, pp. 1619-1629, June 2014.a
[4] F. Z. Peng and J. S. Lai, "Generalized instantaneous reactive power theory for three-phase power systems," IEEE Trans. Instrum. Meas., vol. 45, no. 1, pp. 293-297, February 1996.
[5] L. K. Haw, M. S. Dahidah, and H. A. F. Almurib, "A new reactive current reference algorithm for the STATCOM system based on cascaded multilevel inverters," IEEE Trans. Power Electron., vol. 30, no. 7, pp. 3577-3588, July 2015.
[6] J. A. Munoz, J. R. Espinoza, C. R. Baier, L. A. Moran, J. I. Guzman, and V. M. Cardenas, "Decoupled and modular harmonic compensation for multilevel STATCOMs," IEEE Trans. Ind. Electron., vol. 61, no. 6, pp. 2743-2753, June 2014.
[7] V. Soares and P. Verdelho, "An instantaneous active and reactive current component method for active filters," IEEE Trans. Power Electron., vol. 15, no. 4, pp. 660-669, July 2000.
[8] M. Hagiwara, R. Maeda, and H. Akagi, "Negative-sequence reactive-power control by a PWM STATCOM based on a modular multilevel cascade converter (MMCC-SDBC)," IEEE Trans. Ind. Appl., vol. 48, no. 2, pp. 720-729, 2012.
[9] B. Singh and S. R. Arya, "Back-propagation control algorithm for power quality improvement using DSTATCOM," IEEE Trans. Ind. Electron., vol. 61, no. 3, pp. 1204-1212, March 2014.
[10] M.-C. Wong, C.-S. Lam, and N.-Y. Dai, "Capacitive-coupling STATCOM and its control," Chinese Patent for Invention, Granted, No. 200710196710.6, May 2011.
[11] C.-S. Lam, M.-C. Wong, W.-H. Choi, X.-X. Cui, H.-M. Mei, and J.-Z. Liu, "Design and performance of an adaptive low-dc-voltage-controlled LC-Hybrid active power filter with a neutral inductor in three-phase four-wire power systems," IEEE Trans. Ind. Electron., vol. 61, no. 6 pp. 2635-2647, June 2014.
[12] S. Rahmani, A. Hamadi, N. Mendalek, and K. Al-Haddad, "A new control technique for three-phase shunt hybrid power filter," IEEE Trans. Ind. Electron., vol. 56, no. 8, pp. 2904-2915, August 2009.
[13] S. Rahmani, A. Hamadi, and K. Al-Haddad, "A Lyapunov-function-based control for a three-phase shunt hybrid active filter," IEEE Trans. Ind. Electron., vol. 59, no. 3, pp. 1418-1429, March 2012.
[14] H. Akagi and K. Isozaki, "A hybrid active filter for a three-phase 12-pulse diode rectifier used as the front end of a medium-voltage motor drive," IEEE Trans. Power Electron., vol. 27, no. 1, pp. 69-77, January 2012.
[15] C. Kumar and M. Mishra, "An improved hybrid DSATCOM topology to compensate reactive and nonlinear loads," IEEE Trans. Ind. Electron., vol. 61, no. 12, pp. 6517-6527, December 2014.
[16] J. He, Y. W. Li, and F. Blaabjerg, "Flexible microgrid power quality enhancement using adaptive hybrid voltage and current controller," IEEE Trans. Ind. Electron, vol. 61, no. 6, pp. 2784-2794, June 2014.
[17] S. Hu, Z. Zhang, Y. Chen, et al. "A new integrated hybrid power quality control system for electrical railway," IEEE Trans. Ind. Electron., vol. 62, no. 10, pp. 6222-6232, October 2015.
[18] K-W. Lao, M-C. Wong, N. Y. Dai, C-K. Wong, and C-S. Lam, "A systematic approach to hybrid railway power conditioner design with harmonic compensation," IEEE Trans. Ind. Electron., vol. 62, no. 2, pp. 930-942, February 2015.
[19] K.-W. Lao, N. Dai, W.-G. Liu, and M.-C. Wong, "Hybrid power quality compensator with minimum DC operation voltage design for high-speed traction power systems," IEEE Trans. Power Electron., vol. 28, no. 4, pp. 2024-2036, April 2013.
[20] A. Varschaysky, J. Dixon, M. Rotella, and L. Moran, "Cascaded nine-level inverter for hybrid-series active power filter, using industrial controller," IEEE Trans. Ind. Electron., vol. 57, no. 8, pp. 2761-2767, August 2010.
[21] S. P. Litran and P. Salmeron, "Reference voltage optimization of a hybrid filter for nonlinear load reference," IEEE Trans. Ind. Electron., vol. 61, no. 6, pp. 2648-2654, June 2014.
[22] J. Dixon, Y. del Valle, M. Orchard, M. Ortuzar, L. Moran, and C. Maffrand, "A full compensating system for general loads, based on a combination of thyristor binary compensator, and a PWM-IGBT active power filter," IEEE Trans. Ind. Electron., vol. 50, no. 5, pp. 982-989, October 2003.
[23] IEEE recommended practices and requirements for harmonic control in electrical power systems, 2014, IEEE Standard 519-2014.

The large reactive current in transmission systems is one of the most common power problems that increases transmission losses and lowers the stability of a power system [1]-[19]. Application of reactive power compensators is one of the solutions for this issue.

Static VAR compensators (SVCs) are traditionally used to dynamically compensate reactive current as the loads vary from time to time. However, SVCs suffer from many problems, such as resonance problems, harmonic current injection, and slow response [2]-[3]. To overcome these disadvantages, static synchronous compensators (STATCOMs) and active power filters (APFs) were developed for reactive current compensation with faster response, less harmonic current injection, and better performance [4]-[9]. However, the STATCOMs or APFs usually require multilevel structures in a medium- or high-voltage level transmission system to reduce the high-voltage stress across each power switch and DC-link capacitor, which drives up the initial and operational costs of the system and also increases the control complexity. Later, series-type capacitive-coupled STATCOMs (C-STATCOMs) were proposed to reduce the system DC-link operating voltage requirement [10], and other series-type hybrid structures that consist of different passive power filters (PPFs) in series with STATCOMs or APF structures (PPF-STATCOMs) have been applied to power distribution systems [11]-[16] and traction power systems [17]-[19]. However, C-STATCOMs and other series-type PPF-STATCOMs contain relatively narrow reactive power compensation ranges. When the required compensating reactive power is outside their compensation ranges, their system performances can significantly deteriorate.

To improve the operating performances of the traditional STATCOMs, C-STATCOMs, and other PPF-STATCOMs, many different control techniques have been proposed, such as the instantaneous p-q theory [4], [10], [11], [17]-[19], the instantaneous d-q theory [5], [6], [14], the instantaneous $i_d$-$i_q$ method [7], negative- and zero-sequence control [8], the back propagation (BP) control method [9], nonlinear control [12], Lyapunov-function-based control [13], instantaneous symmetrical component theory [15], and hybrid voltage and current control [16].

To reduce the current rating of the STATCOMs or APFs, a hybrid combination structure of PPF in parallel with STATCOM (PPF//STATCOM) was proposed in [20] and [21]. However, this hybrid compensator is dedicated for inductive loading operation. When it is applied for capacitive loading compensation, it easily loses its small active inverter rating characteristics. To enlarge the compensation range and keep low current rating characteristic of the APF, Dixon et al. [22] proposed another hybrid combination structure of SVC in parallel with APF (SVC//APF) in three-phase distribution systems. In this hybrid structure, the APF is controlled to eliminate the harmonics and compensate for the small amounts of load reactive and unbalanced power left by the SVC. However, if this structure is applied in a medium- or high-voltage level transmission system, the APF still requires a costly voltage step-down transformer and/or multilevel structure. In addition, these two parallel connected-hybrid STATCOM structures [15]-[17] may suffer from a resonance problem.

To overcome the shortcomings of different reactive power compensators [1]-[22] for transmission systems, this invention provides a hybrid-STATCOM that consists of a thyristor-controlled LC part (TCLC) and an active inverter part, as shown in FIG. 1. The TCLC part provides a wide reactive power compensation range and a large voltage drop between the system voltage and the inverter voltage so that the active inverter part can continue to operate at a low DC-link voltage level. The small rating of the active inverter part is used to improve the performances of the TCLC part by absorbing the harmonic current generated by the TCLC part, avoiding mistuning of the firing angles, and preventing the resonance problem.

SUMMARY OF THE INVENTION

It is an objective of the present invention to provide a hybrid-STATCOM with the distinctive characteristics of a much wider compensation range than C-STATCOM [10] and other series-type PPF-STATCOMs [11]-[19] and a much lower DC-link voltage than traditional STATCOM [4]-[9] and other parallel-connected hybrid STATCOMs [20]-[22]. The V-I characteristic of the hybrid-STATCOM is analyzed to provide a clear view of its advantages in comparison with traditional STATCOM and C-STATCOM. The parameter design method of the hybrid-STATCOM is based on consideration of the reactive power compensation range, the filtering out of the current ripple caused by the power switches, and avoidance of mistuning of firing angle.

It is a further objective of the present invention to provide a method of controlling the hybrid-STATCOM to coordinate the TCLC part and the active inverter part for reactive power compensation under different voltage and current conditions, such as unbalanced current, voltage fault, and voltage dip.

The characteristics of different reactive power compensators and the hybrid-STATCOM are compared and summarized in Table I below.

TABLE I

Comparisons of the Characteristics Among Different Compensators

| | Response time | Resonance problem | DC-link voltage | Compensation range | Cost |
|---|---|---|---|---|---|
| SVCs [2]-[3] | Slow** | Yes** | — | Wide | Low |
| STATCOMs [4]-[9] | Very Fast | No | High** | Wide | High** |
| C-STATCOMs [10] | Fast | No | Low | Narrow** | Low |
| Series-type PPF-STATCOMs [11]-[19] | Fast | No | Low | Narrow** | Low |
| PPF//STATCOM [20], [21] | Fast | Yes** | High** | Narrow** | Medium |
| SVC//APF [22] | Fast | Yes** | High** | Wide | High** |
| Hybrid-STATCOM | Fast | No | Low | Wide | Medium |

**Unfavorable characteristic.

BRIEF DESCRIPTION OF THE DRAWINGS

Embodiments of the invention are described in more details hereinafter with reference to the drawings, in which.

DETAILED DESCRIPTION

In the following description, STATCOMs and methods of controlling thereof and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Circuit Configuration of Hybrid-STATCOM

Figure 1:
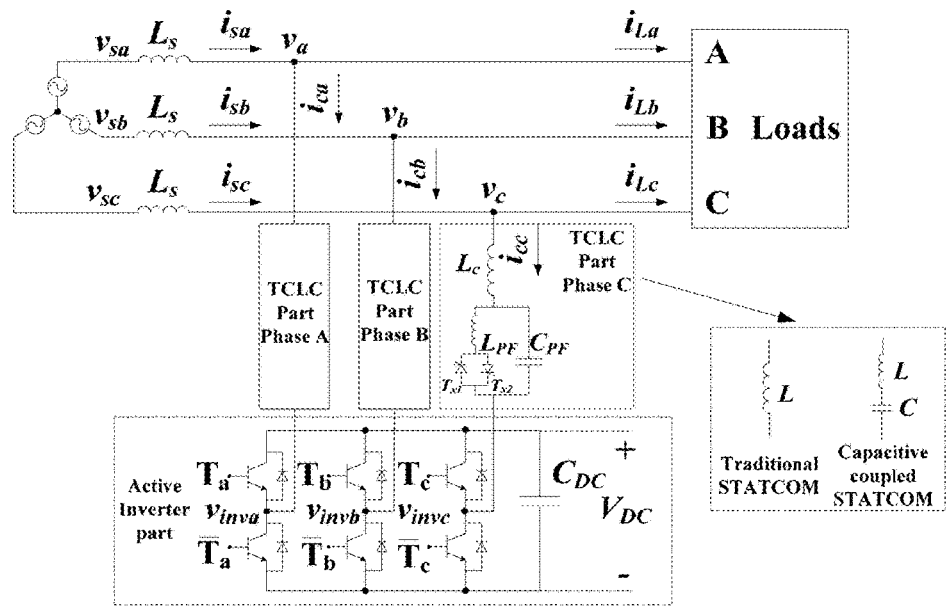
FIG. 1 shows a circuit configuration of a hybrid-STATCOM in accordance to an embodiment of the present invention.

FIG. 1 shows a circuit configuration of a hybrid-STATCOM in accordance with an embodiment of the present invention, in which the subscript "x" stands for phase a, b, and c in the following analysis. $v_{sx}$ and $v_x$ are the source and load voltage; $i_{sx}$, $i_{Lx}$, and $i_{cx}$ are the source, load, and compensating current, respectively. $L_s$ is the transmission line impedance. The hybrid-STATCOM consists of a TCLC and an active inverter part.

The TCLC part is composed of a coupling inductor $L_c$, a parallel capacitor $C_{PF}$, and a thyristor-controlled reactor with $L_{PF}$. The TCLC part provides a wide and continuous inductive and capacitive reactive power compensation range that is controlled by controlling the firing angles $a_x$ of the thyristors. The active inverter part is composed of a voltage source inverter with a DC-link capacitor $C_{DC}$, and the small rating active inverter part is used to improve the performance of the TCLC part. In addition, the coupling components of the traditional STATCOM and C-STATCOM are also presented in FIG. 1.

V-I Characteristics of Traditional STATCOM, C-STATCOM and Hybrid-STATCOM

The purpose of the hybrid-STATCOM is to provide the same amount of reactive power as the loadings ($Q_{Lx}$) consumed, but with the opposite polarity ($Q_{cx}=-Q_{Lx}$). The hybrid-STATCOM compensating reactive power $Q_{cx}$ is the sum of the reactive power $Q_{cx,TCLC}$ that is provided by the TCLC part and the reactive power $Q_{invx}$ that is provided by the active inverter part. Therefore, the relationship among $Q_{Lx}$, $Q_{cx,TCLC}$, and $Q_{invx}$ can be expressed as:

$$Q_{Lx}=-Q_{cx}=-(Q_{cx,TCLC}+Q_{invx}) \quad (1)$$

The reactive power can also be expressed in terms of voltage and current as:

$$Q_{Lx}=V_x I_{Lqx}=-(X_{TCLCx}(a_x)I_{cqx}^2+V_{invx}I_{cqx}) \quad (2)$$

where $X_{TCLCx}(a_x)$ is the coupling impedance of the TCLC part; $a_x$ is the corresponding firing angle; $V_x$ and $V_{invx}$ are the root mean square (RMS) values of the coupling point and the inverter voltage; and $I_{Lqx}$ and $I_{cqx}$ are the RMS value of the load and compensating reactive current, where $I_{Lqx}=-I_{cqx}$. Therefore, (2) can be further simplified as:

$$V_{invx}=V_x+X_{TCLCx}(a_x)I_{Lqx} \quad (3)$$

where the TCLC part impedance $X_{TCLCx}(a_x)$ can be expressed as:

$$X_{TCLCx}(\alpha_x) = \frac{X_{TCR}(\alpha_x)X_{C_{PF}}}{X_{C_{PF}} - X_{TCR}(\alpha_x)} + X_{L_c} = \frac{\pi X_{L_{PF}} X_{C_{PF}}}{X_{C_{PF}}(2\pi - 2\alpha_x + \sin 2\alpha_x) - \pi X_{L_{PF}}} + X_{L_c} \quad (4)$$

where $X_{L_c}$, $X_{L_{PF}}$, and $x_{C_{PF}}$ are the fundamental impedances of $L_c$, $L_{PF}$, and $C_{PF}$, respectively. In (4), it is shown that the TCLC part impedance is controlled by firing angle $a_x$. And the minimum inductive and capacitive impedances (absolute value) of the TCLC part can be obtained by substituting the firing angles $a_x=90°$ and $a_x=180°$, respectively. In the following discussion, the minimum value for impedances stands for its absolute value. The minimum inductive ($X_{ind(min)}>0$) and capacitive ($X_{Cap(min)}<0$) TCLC part impedances can be expressed as:

$$X_{Ind(min)}(\alpha_x = 90°) = \frac{X_{L_{PF}} X_{C_{PF}}}{X_{C_{PF}} - X_{L_{PF}}} + X_{L_c} \quad (5)$$

$$X_{Cap(min)}(\alpha_x = 180°) = -X_{C_{PF}} + X_{L_c} \quad (6)$$

Ideally, $X_{TCLCx}(a_x)$ is controlled to be $V_x \approx X_{TCLCx}(a_x)I_{Lqx}$, so that the minimum inverter voltage ($V_{invx} \approx 0$) can be obtained as shown in (3). In this case, the switching loss and switching noise can be significantly reduced. A small inverter voltage $V_{invx(min)}$ is necessary to absorb the harmonic current generated by the TCLC part, to prevent a resonance problem, and to avoid mistuning the firing angles. If the loading capacitive current or inductive current is outside the TCLC part compensating range, the inverter voltage $V_{invx}$ will be slightly increased to further enlarge the compensation range.

The coupling impedances for traditional STATCOM and C-STATCOM, as shown in FIG. 1, are fixed as $X_L$ and $X_L-X_C$. The relationships among the load voltage $V_x$, the inverter voltage $V_{invx}$, the load reactive current $I_{Lqx}$, and the coupling impedance of traditional STATCOM and C-STATCOM can be expressed as:

$$V_{invx}=V_x+X_L I_{Lqx} \quad (7)$$

$$V_{invx}=V_x-(X_C-X_L) \cdot I_{Lqx} \quad (8)$$

where $X_c \gg X_L$. Based on (3)-(8), the V-I characteristics of the traditional STATCOM, C-STATCOM, and hybrid-STATCOM can be plotted as shown in FIG. 2a, FIG. 2b, and FIG. 2c respectively.

Figure 2A:
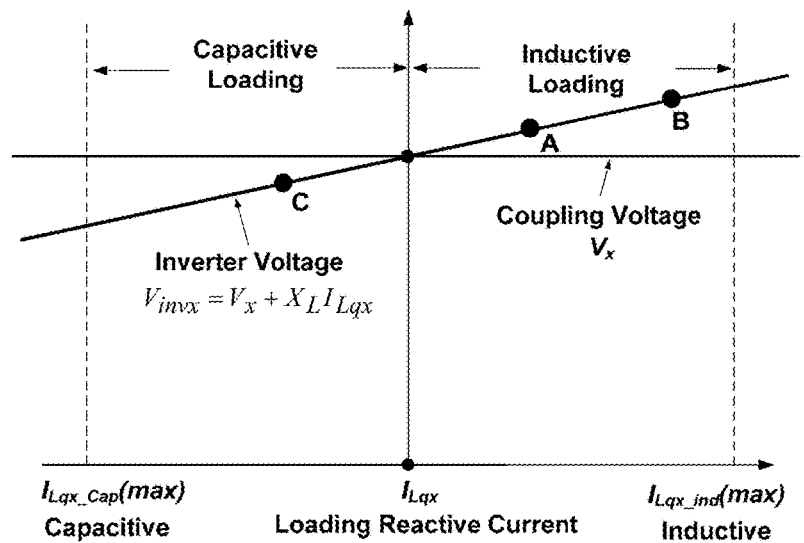
FIG. 2a depicts the V-I characteristics of a traditional STATCOM.

For the V-I characteristics of traditional STATCOM as shown in FIG. 2a, the required $V_{invx}$ is larger than $V_x$ when the loading is inductive. In contrast, the required $V_{invx}$ is smaller than $V_x$ when the loading is capacitive. Actually, the required inverter voltage $V_{invx}$ is close to the coupling voltage $V_x$, due to the small value of coupling inductor L [5]-[8].

Figure 2B:
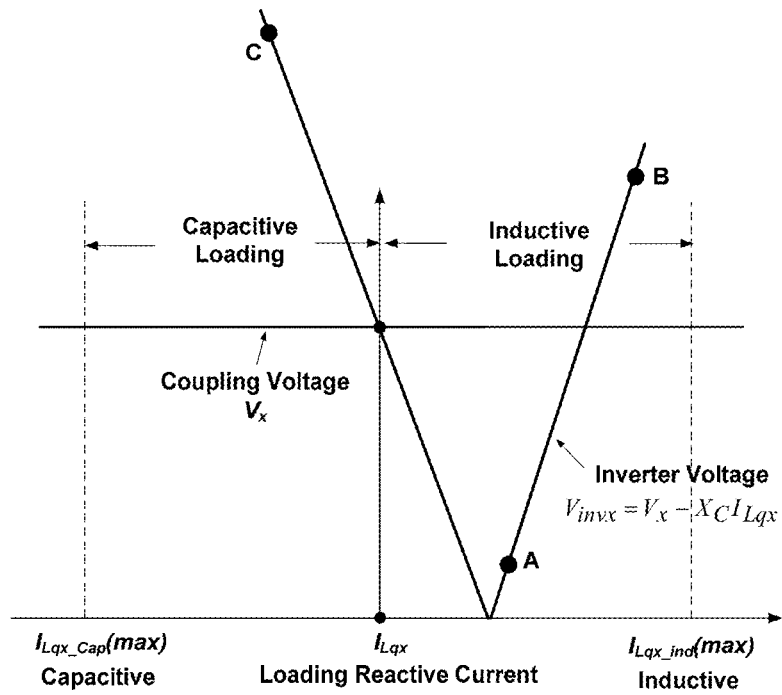
FIG. 2b depicts the V-I characteristics of a C-STATCOM.

For the V-I characteristics of C-STATCOM as shown in FIG. 2b, it is shown that the required $V_{invx}$ is lower than $V_x$ under a small inductive loading range. The required $V_{invx}$ can be as low as zero when the coupling capacitor can fully compensate for the loading reactive current. In contrast, $V_{invx}$ is larger than $V_x$ when the loading is capacitive or outside its small inductive loading range. Therefore, when the loading reactive current is outside its designed inductive range, the required $V_{invx}$ can be very large.

Figure 2C:
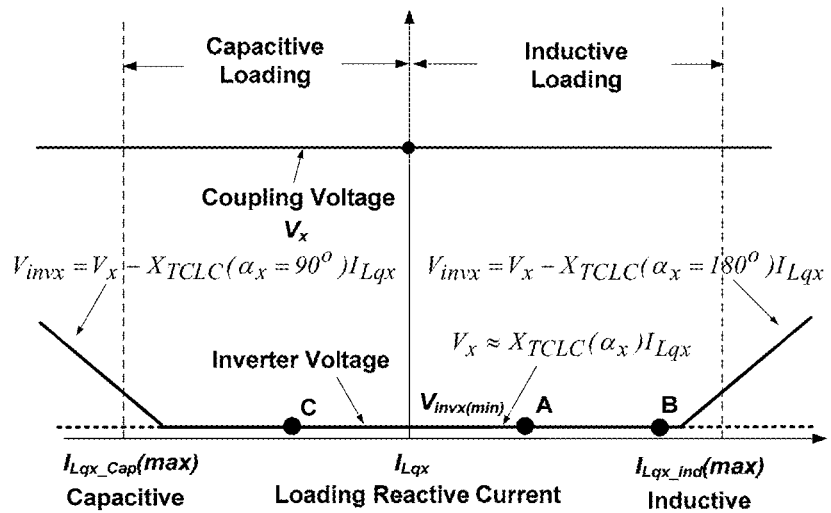
FIG. 2c depicts the V-I characteristics of the hybrid-STATCOM.

For the V-I characteristics of the hybrid-STATCOM as shown in FIG. 2c, the required $V_{invx}$ can be maintained at a low (minimum) level ($V_{invx(min)}$) for a large inductive and capacitive reactive current range. Moreover, when the loading reactive current is outside the compensation range of the TCLC part, the $V_{invx}$ will be slightly increased to further enlarge the compensating range. Compared with traditional STATCOM and C-STATCOM, the hybrid-STATCOM has a superior V-I characteristic of a large compensation range with a low inverter voltage.

In addition, three cases represented by points A, B, and C in FIG. 2 are simulated below. Based on FIG. 1, the parameter design of hybrid-STATCOM is discussed in the following part.

Parameter Design of Hybrid-STATCOM

The TCLC in accordance to an embodiment of the present invention is a SVC structure, which is designed based on the basis of the consideration of the reactive power compensation range (for $L_{PF}$ and $C_{PF}$) and the filtering out of the current ripple caused by the power switches (for $L_c$). The active inverter part (DC-link voltage $V_{DC}$) is designed to avoid mistuning of the firing angle of TCLC part.

Design of $C_{PF}$ and $L_{PF}$

The purpose of the TCLC part is to provide the same amount of compensating reactive power $Q_{cx,TCLC}(a_x)$ as the reactive power required by the loads $Q_{Lx}$ but with the opposite direction. Therefore, $C_{PF}$ and $L_{PF}$ are designed on the basis of the maximum capacitive and inductive reactive power. The compensating reactive power $Q_{cx}$ range in term of TCLC impedance $X_{TCLCx}(a_x)$ can be expressed as:

$$Q_{cx,TCLC}(\alpha_x) = \frac{V_x^2}{X_{TCLCx}(\alpha_x)} \quad (9)$$

where $V_x$ is the RMS value of the load voltage and $X_{TCLCx}(a_x)$ is the impedance of the TCLC part, which can be obtained from (4). In (9), when the $X_{TCLCx}(a_x)=X_{Cap(min)}$ ($a_x=180°$) and $X_{TCLCx}(a_x)=X_{Ind(min)}(a_x=90°)$, the TCLC part provides the maximum capacitive and inductive compensating reactive power $Q_{cx(MaxCap)}$ and $Q_{cx(MaxInd)}$, respectively.

$$Q_{cx(MaxCap)} = \frac{V_x^2}{X_{Cap(min)}(\alpha_x = 180°)} = -\frac{V_x^2}{X_{C_{PF}} - X_{L_c}} \quad (10)$$

$$Q_{cx(MaxInd)} = \frac{V_x^2}{X_{Ind(min)}(\alpha_x = 90°)} = -\frac{V_x^2}{\frac{X_{L_{PF}} X_{C_{PF}}}{X_{C_{PF}} - X_{L_{PF}}} + X_{L_c}} \quad (11)$$

where the minimum inductive impedance $X_{Ind(min)}$ and the capacitive impedance $X_{Cap(min)}$ are obtained from (5) and (6), respectively.

To compensate for the load reactive power ($Q_{cx}=-Q_{Lx}$), $C_{PF}$ and $L_{PF}$ can be deduced on the basis of the loading maximum inductive reactive power $Q_{Lx(MaxInd)}$ (= $-Q_{cx(MaxCap)}$) and capacitive reactive power $Q_{Lx(MaxCap)}$ (=$-Q_{cx(MaxInd)}$). Therefore, based on (10) and (11), the parallel capacitor $C_{PF}$ and inductor $L_{PF}$ can be designed as:

$$C_{PF} = \frac{Q_{Lx(MaxInd)}}{\omega^2 Q_{Lx(MaxInd)} L_c + \omega V_x^2} \quad (12)$$

$$L_{PF} = \frac{V_x^2 + \omega L_c Q_{Lx(MaxCap)}}{-\omega Q_{Lx(MaxCap)} + \omega^3 L_c C_{PF} Q_{Lx(MaxCap)} + \omega^2 V_x^2 C_{PF}} \quad (13)$$

where ω is the fundamental angular frequency and $V_x$ is the RMS load voltage.

Design of $L_c$

The purposes of $L_c$ in TCLC is to filter out the current ripple caused by the power switches of active inverter part, and the value of the $L_c$ can be designed as:

$$L_c \geq \frac{V_{DC}}{8 \cdot f_s \cdot \Delta i_{L_c} \max} \quad (14)$$

where $f_s$ is the switching frequency of active inverter, $\Delta i_{Lcmax}$ is the maximum allowed output current ripple value, and $V_{DC}$ is the DC-link voltage.

Design of $V_{DC}$

Different with the traditional $V_{DC}$ design method of the STATCOM to compensate maximum load reactive power, the $V_{DC}$ of Hybrid-STATCOM is designed to solve the firing angle mistuning problem of TCLC (i.e., affect the reactive power compensation) so that the source reactive power can be fully compensated. Reforming (3), the inverter voltage $V_{invx}$ can also be expressed as:

$$V_{invx} = V_x \left[ 1 + \frac{V_x I_{Lqx}}{\frac{V_x^2}{X_{TCLC}(\alpha_x)}} \right] = V_x \left[ 1 + \frac{Q_{Lx}}{Q_{cx,TCLC}(\alpha_x)} \right] \quad (15)$$

where $Q_{Lx}$ is the load reactive power, $Q_{cx,TCLC}(a_x)$ is the TCLC part compensating reactive power, and $V_x$ is the RMS value of the phase load voltage. Then the required DC-link voltage $V_{DCx}$ of each phase and $V_{DC}$ for hybrid-STATCOM can be expressed as:

$$V_{DCx} = \sqrt{6} V_x \left| 1 + \frac{Q_{Lx}}{Q_{cx,TCLC}(\alpha_x)} \right| \quad (16)$$

and $V_{DC}=\max(V_{DCa}, V_{DCb}, V_{DCc})$.

Ideally, $Q_{cx,TCLC}(a_x)$ is controlled to be equal to $-Q_{Lx}$ so that the required $V_{DC}$ can be zero. However, in the practical case, the $Q_{cx,TCLC}(a_x)$ may not be exactly equal to $-Q_{Lx}$ due to the firing angle mistuning problem. The worst case of mistuning $Q_{Lx}/Q_{cx,TCLC}(a_x)$ ratio can be pre-measured to estimate the required minimum $V_{DC}$ value. Finally, a slightly greater $V_{DC}$ value can be chosen. Based on (12), (13), (14), and (16), the system parameters $C_{PF}$, $L_{PF}$, $L_c$, and $V_{DC}$ of hybrid-STATCOM can be designed accordingly.

Method of Controlling the Hybrid-STATCOM

Figure 3:
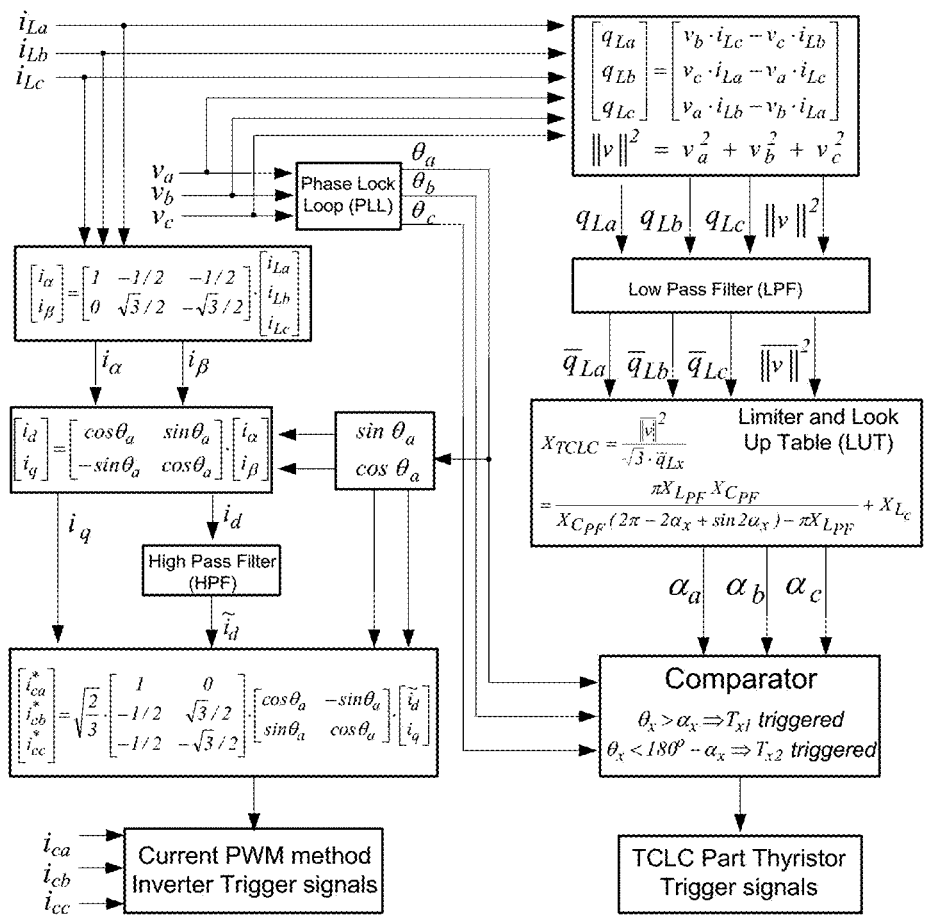
FIG. 3 shows the control block diagram of the hybrid-STATCOM.

A method of controlling the hybrid-STATCOM is provided by coordinating the control of the TCLC part and the active inverter part so that the two parts can complement each other's disadvantages and the overall performance of hybrid-STATCOM can be improved. Specifically, with the controller in accordance to various embodiments of the present invention, the response time of the hybrid-STAT-COM can be faster than SVCs, and the active inverter part can operate at lower DC-link operating voltage than the traditional STATCOMs. The control block diagram of hybrid-STATCOM is shown in FIG. 3.

TCLC Part Control

Different from the traditional SVC control based on the traditional definition of reactive power [2]-[3], to improve its response time, the TCLC part control is based on the instantaneous pq theory [4]. The TCLC part is mainly used to compensate the reactive current with the controllable TCLC part impedance $X_{TCLCx}$. Referring to (3), to obtain the minimum inverter voltage $V_{invx} \approx 0$, $X_{TCLCx}$ can be calculated with Ohm's law in terms of the RMS values of the load voltage ($V_x$) and the load reactive current ($I_{Lqx}$). However, to calculate the $X_{TCLCx}$ in real time, the expression of $X_{TCLCx}$ can be rewritten in terms of instantaneous values as:

$$X_{TCLCx} = \frac{V_x}{I_{Lqx}} = \frac{\|v\|^2}{\sqrt{3}\, \bar{q}_{Lx}} \tag{17}$$

where $\|v\|$ is the norm of the three-phase instantaneous load voltage and $\bar{q}_{Lx}$ is the DC component of the phase reactive power of the load, and x can be a, b or c. The real-time expression of $\|v\|$ and $\bar{q}_{Lx}$ can be obtained by (18) and (19) with low-pass filters.

$$\|v\| = \sqrt{v_a^2 + v_b^2 + v_c^2} \tag{18}$$

$$\begin{bmatrix} q_{La} \\ q_{Lb} \\ q_{Lc} \end{bmatrix} = \begin{bmatrix} v_b \cdot i_{Lc} - v_c \cdot i_{Lb} \\ v_c \cdot i_{La} - v_a \cdot i_{Lc} \\ v_a \cdot i_{Lb} - v_b \cdot i_{La} \end{bmatrix} \tag{19}$$

In (18) and (19), $v_x$ and $q_{Lx}$ are the instantaneous load voltage and the load reactive power, respectively. As shown in FIG. 3, a limiter is applied to limit the calculated $X_{TCLCx}$ in (9) within the range of $X_{TCLCx} > X_{ind(min)}$ and $X_{TCLCx} < X_{Cap(min)}$ ($X_{Cap(min)} < 0$). With the calculated $X_{TCLCx}$, the firing angle $a_x$ can be determined by solving (4). Because (4) is complicated, a look-up table (LUT) is installed inside the controller. The trigger signals to control the TCLC part can then be generated by comparing the firing angle $a_x$ with $\theta_x$, which is the phase angle of the load voltage $v_x$. $\theta_x$ can be obtained by using a phase lock loop (PLL). Note that the firing angle of each phase can differ if the unbalanced loads are connected (see (4) and (17)). With the control algorithm, the reactive power of each phase can be compensated and the active power can be basically balanced, so that DC-link voltage can be maintained at a low level even under unbalanced load compensation.

Active Inverter Part Control

In the control method, the instantaneous active and reactive current $i_d$-$i_q$ method [7] is implemented for the active inverter part to improve the overall performance of hybrid-STATCOM under different voltage and current conditions, such as balanced/unbalanced, voltage dip, and voltage fault. Specifically, the active inverter part is used to improve the TCLC part characteristic by limiting the compensating current $i_{cx}$ to its reference value $i_{cx}^*$ so that the mistuning problem, the resonance problem, and the harmonic injection problem can be avoided. The $i_{cx}^*$ is calculated by applying the $i_d$-$i_q$ method [7] because it is valid for different voltage and current conditions.

The calculated $i_{cx}^*$ contains reactive power, unbalanced power, and current harmonic components. By controlling the compensating current $i_{cx}$ to track its reference $i_{cx}^*$, the active inverter part can compensate for the load harmonic current and improve the reactive power compensation ability and dynamic performance of the TCLC part under different voltage conditions. The $i_{cx}^*$ can be calculated as:

$$\begin{bmatrix} i_{ca}^* \\ i_{cb}^* \\ i_{cc}^* \end{bmatrix} = \sqrt{\frac{2}{3}} \cdot \begin{bmatrix} 1 & 0 \\ -1/2 & \sqrt{3}/2 \\ -1/2 & -\sqrt{3}/2 \end{bmatrix} \cdot \begin{bmatrix} \cos\theta_a & -\sin\theta_a \\ \sin\theta_a & \cos\theta_a \end{bmatrix} \cdot \begin{bmatrix} \tilde{i}_d \\ \tilde{i}_q \end{bmatrix} \tag{20}$$

where $i_d$ and $i_q$ are the instantaneous active and reactive current, which include DC components $\bar{i}_d$ and $\bar{i}_q$, and AC components $\tilde{i}_d$ and $\tilde{i}_q$. $\tilde{i}_d$ is obtained by passing $i_d$ through a high-pass filter. $i_d$ and $i_q$ are obtained by:

$$\begin{bmatrix} i_d \\ i_q \end{bmatrix} = \begin{bmatrix} \cos\theta_a & \sin\theta_a \\ -\sin\theta_a & \cos\theta_a \end{bmatrix} \cdot \begin{bmatrix} i_\alpha \\ i_\beta \end{bmatrix} \tag{21}$$

In (21), the current ($i_\alpha$ and $i_\beta$) in $\alpha$-$\beta$ plane are transformed from a-b-c frames by:

$$\begin{bmatrix} i_\alpha \\ i_\beta \end{bmatrix} = \begin{bmatrix} 1 & -1/2 & -1/2 \\ 0 & \sqrt{3}/2 & -\sqrt{3}/2 \end{bmatrix} \cdot \begin{bmatrix} i_{La} \\ i_{Lb} \\ i_{Lc} \end{bmatrix} \tag{22}$$

where $i_{Lx}$ is the load current signal.

The TCLC part has two back-to-back connected thyristors in each phase that are triggered alternately in every half cycle, so that the control period of the TCLC part is one cycle (0.02 s). However, the hybrid-STATCOM structure connects the TCLC part in series with an instantaneous operated active inverter part, which can significantly improve its overall response time. With the controller, the active inverter part can limit the compensating current $i_{cx}$ to its reference value $i_{cx}^*$ via pulse width modulation (PWM) control, and the PWM control frequency is set to be 12.5 kHz. During the transient state, the response time of hybrid-STATCOM can be separately discussed in the following two cases: a.) if the load reactive power is dynamically changing within the inductive range (or within the capacitive range), the response time of hybrid-STATCOM can be as fast as traditional STATCOM; and b.) in contrast, when the load reactive power suddenly changes from capacitive to inductive or vice versa, the hybrid-STATCOM may take approximately one cycle to settle down. However, in practical application, case b.) described above seldom happens. Therefore, based on the above, the hybrid-STATCOM can be considered as a fast-response reactive power compensator in which the dynamic performances of hybrid-STATCOM are proved by the simulation result shown in FIG. 4 and the experimental results shown in FIGS. 5, 6, and 10.

Simulation Results

In the following, the simulation results among traditional STATCOM, C-STATCOM, and the hybrid-STATCOM are discussed and compared. The previous discussions of the required inverter voltage (or DC-link voltage $V_{DC}=\sqrt{2} \cdot \sqrt{3} \cdot V_{invx}$) for these three STATCOMs are also verified by simulations. The STATCOMs are simulated with the same voltage level as in the experimental results. The simulation studies are carried out with PSCAD/EMTDC. Table III shows the simulation system parameters for traditional STATCOM, C-STATCOM, and hybrid-STATCOM. In addition, three different cases of loading are built for testing: a.) inductive and light loading, b.) inductive and heavy loading, and c.) capacitive loading. These three testing cases are also represented by points A, B, and C in FIG. 2. The detailed simulation results are summarized Table II.

With the consideration of IEEE standard 519-2014 [23], total demand distortion (TDD)=15% and $I_{SC}/I_L$ in 100<1000 scale at a typical case, the nominal rate current is assumed to be equal to the fundamental load current in the worst-case analysis, which results in THD=TDD=15%. Therefore, this paper evaluates the compensation performance by setting THD<15%.

a.) Inductive and Light Loading

When the loading is inductive and light, traditional STATCOM requires a high DC-link voltage ($V_{DC}>\sqrt{2} \cdot V_{L-L}=269V$, $V_{DC}=300V$) for compensation. After compensation, the source current $i_{sx}$ is reduced to 5.55 A from 6.50 A and the source-side displacement power factor (DPF) becomes unity from 0.83. In addition, the source current total harmonics distortion (THD$_{isx}$) is 7.22% after compensation, which satisfies the international standard [23] (THD$_{isx}$<15%).

For C-STATCOM, the coupling impedance contributes a large voltage drop between the load voltage and the inverter voltage so that the required DC-link voltage can be small ($V_{DC}=80V$). The $i_{sx}$, DPF and THD$_{isx}$ are compensated to 5.48 A, unity, and 2.01%, respectively.

For the hybrid-STATCOM, the $i_{sx}$, DPF, and THD$_{isx}$ are compensated to 5.48 A, unity, and 1.98%, respectively. As discussed in the previous part, a low DC-link voltage ($V_{DC}=50V$) of hybrid-STATCOM is used to avoid mistuning of firing angles, prevent resonance problems, and reduce the injected harmonic current.

b.) Inductive and Heavy Loading

To compensate for the inductive and heavy loading, traditional STATCOM still requires a high DC-link voltage of $V_{DC}=300V$ for compensation. Traditional STATCOM can obtain acceptable results (DPF=1.00 and THD$_{isx}$=6.55%). The $i_{sx}$ is reduced to 5.95 A from 8.40 A after compensation.

With a low DC-link voltage ($V_{DC}=50V$), C-STATCOM cannot provide satisfactory compensation results (DPF=0.85 and THD$_{isx}$=17.5%). However, when the DC-link voltage is increased to $V_{DC}=300V$, the compensation results (DPF=1.00 and THD$_{isx}$=7.02%) are acceptable and satisfy the international standard [23] (THD$_{isx}$<15%). The $i_{sx}$ is reduced to 5.90 A from 8.40 A after compensation.

On the other hand, the hybrid-STATCOM can still obtain acceptable compensation results (DPF=1.00 and THD$_{isx}$=3.01%) with a low DC-link voltage of $V_{DC}=50V$. The $i_{sx}$ is reduced to 5.89 A from 8.40 A after compensation.

c.) Capacitive Loading

When the loading is capacitive, with $V_{DC}=250V$ ($V_{DC}<\sqrt{2} \cdot V_{L-L}=269V$), the compensation results of traditional STATCOM are acceptable, in which the DPF and THD$_{isx}$ are compensated to unity and 7.61%. The $i_{sx}$ is also reduced to 3.67 A from 4.34 A after compensation.

For C-STATCOM with $V_{DC}=50V$, the $i_{sx}$ increases to 7.10 A from the original 4.34 A. The compensation performances (DPF=0.57 and THD$_{isx}$=23.5%) are not satisfactory, which cannot satisfy the international standard [23] (THD$_{isx}$<15%). When $V_{DC}$ is increased to 500V, the DPF is improved to 0.99 and the THD$_{isx}$ is reduced to 10.6%, which can be explained by its V-I characteristic. However, the compensated $i_{sx}$=5.02 A is still larger than $i_{sx}$=3.73 A before compensation.

With the lowest DC-link voltage ($V_{DC}=50V$) of the three STATCOMs, hybrid-STATCOM can still obtain the best compensation results with DPF=1.00 and THD$_{isx}$=3.01%. In addition, the $i_{sx}$ is reduced to 3.41 A from 4.34 A after compensation.

Dynamic Response of Hybrid-STATCOM

Figure 4:
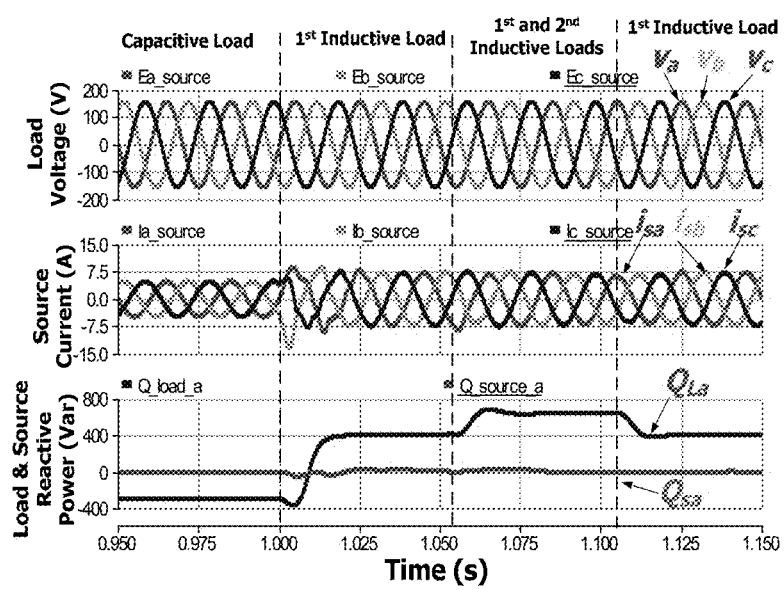
FIG. 4 depicts the dynamic performance of the hybrid-STATCOM for different loadings compensation.

FIG. 4 shows the dynamic performance of hybrid-STATCOM for different loadings compensation. When the load reactive power changes from capacitive to inductive, hybrid-STATCOM takes about one cycle to settle down. However, when the load reactive power is changing within the inductive range, the transient time is significantly reduced and the waveforms are smooth. Meanwhile, the fundamental reactive power is compensated to around zero even during the transient time. In practical situations, the load reactive power seldom suddenly changes from capacitive to inductive or vice versa, and thus hybrid-STATCOM can obtain good dynamic performance.

TABLE II

Simulation Results for Inductive and Capacitive Reactive Power Compensation of Traditional STATCOM, C-STATCOM and Hybrid-STATCOM

| Loading Type | Without and With STATCOM Comp. | $i_{sx}$(A) | DPF | THD$i_{sx}$ (%) | $V_{DC}$ (V) |
|---|---|---|---|---|---|
| Case A: inductive and light loading | Before Comp. | 6.50 | 0.83 | 0.01 | — |
| | Trad. STATCOM | 5.55 | 1.00 | 7.22 | 300 |
| | C-STATCOM | 5.48 | 1.00 | 2.01 | 80 |
| | Hybrid STATCOM | 5.48 | 1.00 | 1.98 | 50 |
| Case B: inductive and heavy loading | Before Comp. | 8.40 | 0.69 | 0.01 | — |
| | Trad. STATCOM | 5.95 | 1.00 | 6.55 | 300 |
| | C-STATCOM | 6.30 | 0.85 | 17.5 | 50 |
| | C-STATCOM | 5.90 | 0.98 | 7.02 | 300 |
| | Hybrid STATCOM | 5.89 | 1.00 | 2.10 | 50 |
| Case C: capacitive loading | Before Comp. | 4.34 | 0.78 | 0.01 | — |
| | Trad. STATCOM | 3.67 | 1.00 | 7.61 | 250 |
| | C-STATCOM | 7.10 | 0.57 | 23.5 | 50 |
| | C-STATCOM | 5.02 | 0.99 | 10.6 | 500 |
| | Hybrid STATCOM | 3.41 | 1.00 | 3.01 | 50 |

According to the above simulation results, Table II verifies the V-I characteristics of the traditional STATCOM, C-STATCOM, and hybrid-STATCOM, as shown in FIG. 2. With similar compensation performance, the capacity of the active inverter part (or DC-link voltage) of the hybrid-STATCOM is only about 16% of that of traditional STATCOM under wide range compensation (both inductive and capacitive). According to the cost study in [14] and [17], the average cost of traditional STATCOM is around USD $60/kVA, whereas that of SVC is only approximately $23/kVA. Therefore, by rough calculation, the average cost of the hybrid-STATCOM is just about $33/kVA (=$60/kVA*16%+ $23/kVA), which is 55% of the average cost of traditional STATCOM. Moreover, because the hybrid-STATCOM can avoid the use of multilevel structures in medium-voltage level transmission system in comparison to traditional STATCOM, the system reliability can be highly increased and the system control complexity and operational costs can be greatly reduced.

Based on the simulation results, a summary can be drawn as follows:

The traditional STATCOM can compensate for both inductive and capacitive reactive current with a high DC-link operating voltage due to a small coupling inductor.

Due to its high DC-link voltage, the traditional STATCOM obtains the poor source current $THD_{isx}$ (caused by switching noise) compared with hybrid-STATCOM.

C-STATCOM has a low DC-link voltage characteristic only under a narrow inductive loading range. However, when the loading current is outside its designed range, the C-STATCOM requires a very high DC-link operating voltage due to a large coupling capacitor.

The hybrid-STATCOM obtains the best performances among the three STATCOMs under both inductive and capacitive loadings.

The hybrid-STATCOM has a wide compensation range with low DC-link voltage characteristic and good dynamic performance.

Experimental Results

The objective of the experiment is to verify that the hybrid-STATCOM has the characteristics of a wide compensation range and low DC-link voltage under different voltage and current conditions, such as unbalanced current, voltage dip, and voltage fault. In the experiment, a 110-V, 5-kVA experimental prototype of the three-phase hybrid-STATCOM is constructed in the laboratory. The control system has a sampling frequency of 25 kHz. The switching devices for the active inverter are Mitsubishi IGBTs PM300DSA060. The switching devices for the TCLC are thyristors SanRex PK110FG160. Moreover, the experimental parameters of the hybrid-STATCOM are the same as those for the simulation listed in Table III. The experimental prototype's DC-link voltage is maintained at $V_{DC}$=50V for all experiments.

TABLE III

Simulation and Experimental Parameters for Traditional STATCOM, C-STATCOM and Hybrid-STATCOM

| | Parameters | Physical values |
|---|---|---|
| System parameters | $v_x$, f, $L_s$ | 110 V, 50 Hz, 0.1 mH |
| Traditional STATCOM | L | 5 mH |
| C-STATCOM | L, C | 5 mH, 80 uF |
| Hybrid-STATCOM | $L_c$, $L_{PF}$, $C_{PF}$ | 5 mH, 30 mH, 160 uF |
| Case A. Inductive and light loading | $L_{L1}$, $R_{L1}$ | 30 mH, 14 Ω |
| Case B. Inductive and heavy loading | $L_{L2}$, $R_{L2}$ | 30 mH, 9 Ω |
| Case C. Capacitive loading | $C_{L3}$, $R_{L3}$ | 200 uF, 20 Ω |

Figure 5A:
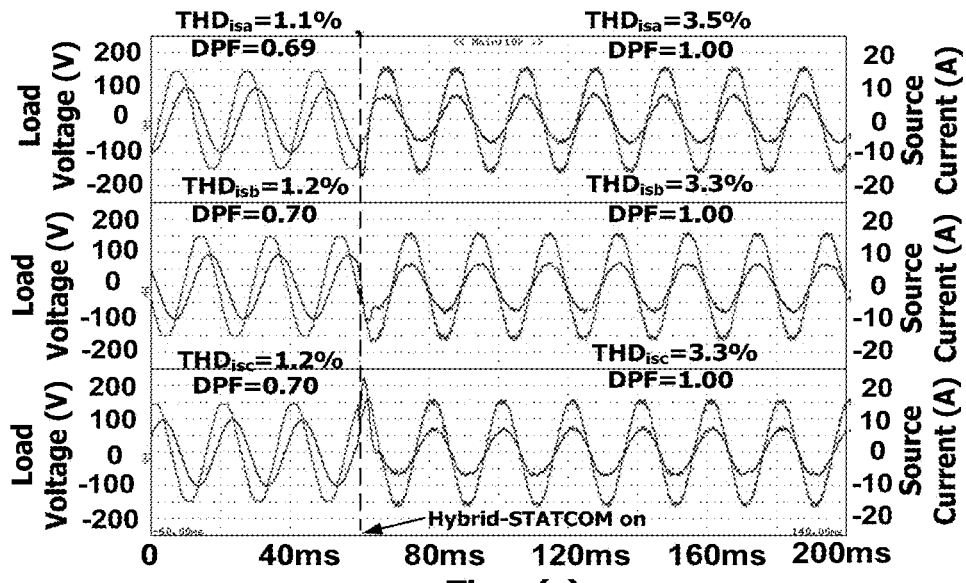
FIG. 5a, FIG. 5b, and FIG. 5c depict the dynamic compensation waveforms of $v_x$ and $i_{sx}$ by applying the hybrid-STATCOM under (a) inductive load, (b) capacitive load and (c) changing from capacitive load to inductive load respectively.
Figure 5B:
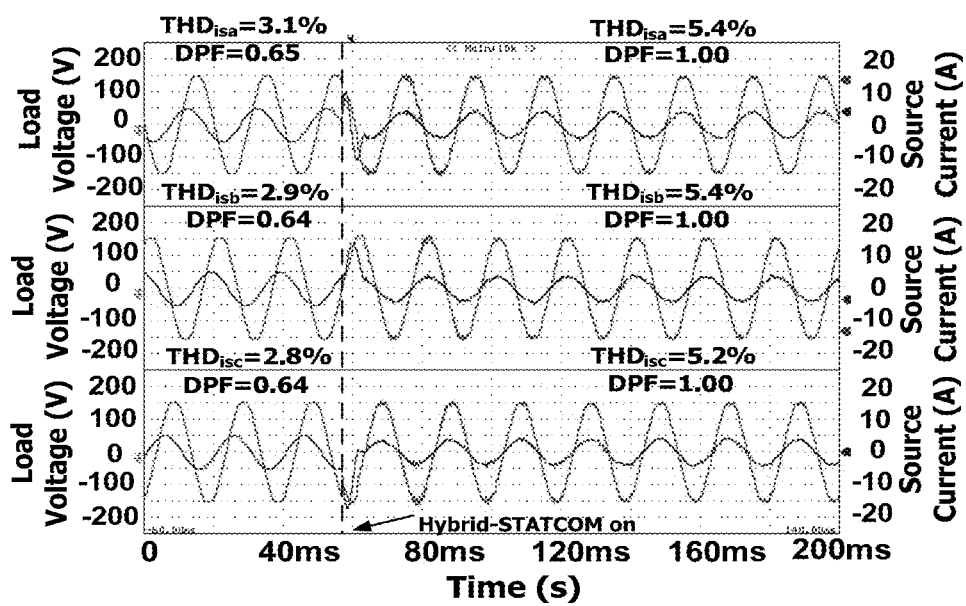
Figure 5C:
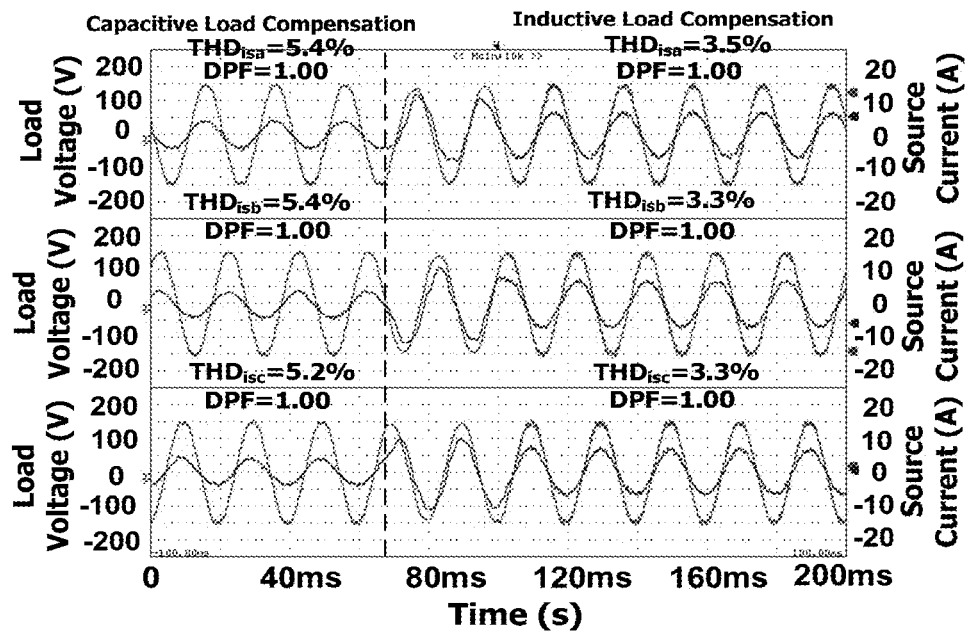
Figure 6:
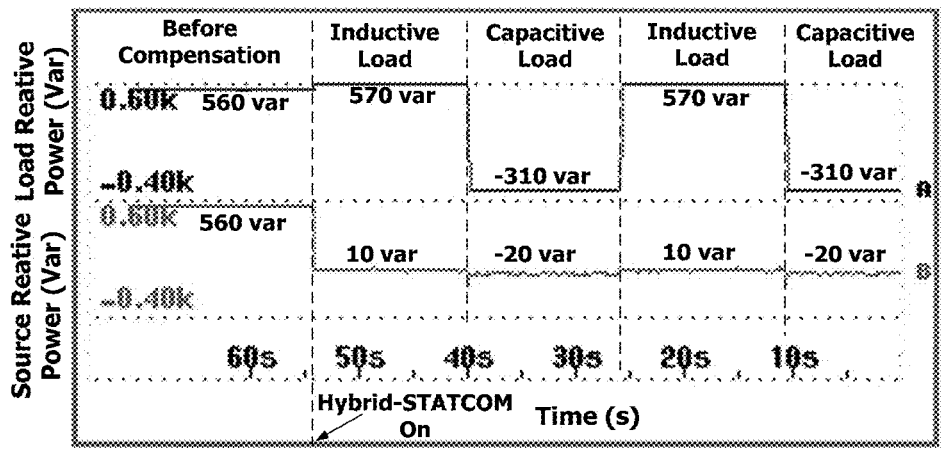
FIG. 6 depicts the dynamic reactive power compensation of phase a by applying the hybrid-STATCOM.
Figure 7A:
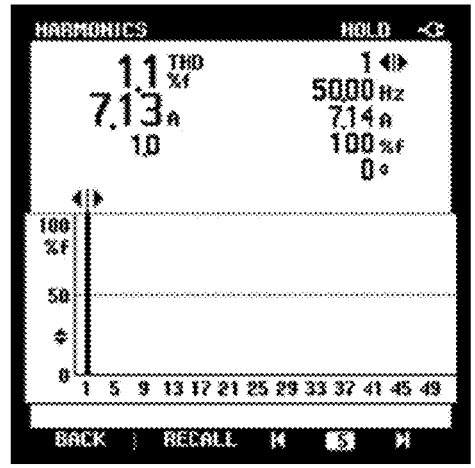
FIG. 7a, FIG. 7b, FIG. 7c, and FIG. 7d depict the source current harmonic spectrums of phase a: (a) before compensation of inductive load, (b) after compensation of inductive load, (c) before compensation of capacitive load, and (d) after compensation of capacitive load respectively.
Figure 7B:
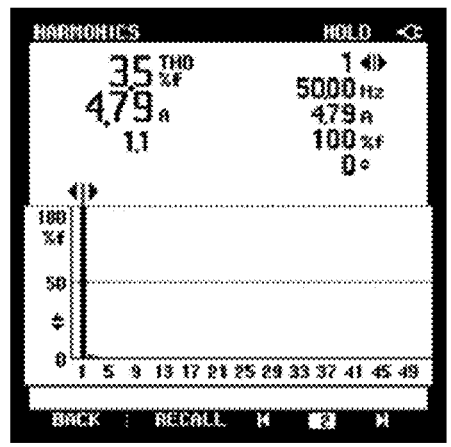
Figure 7C:
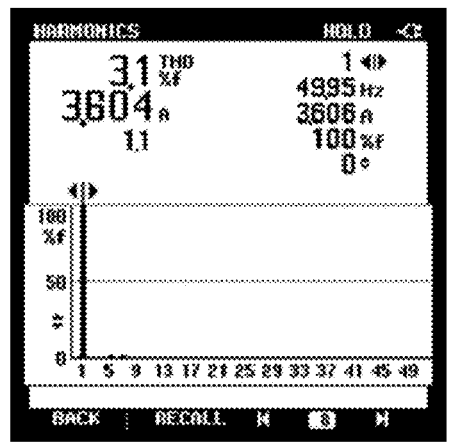
Figure 7D:
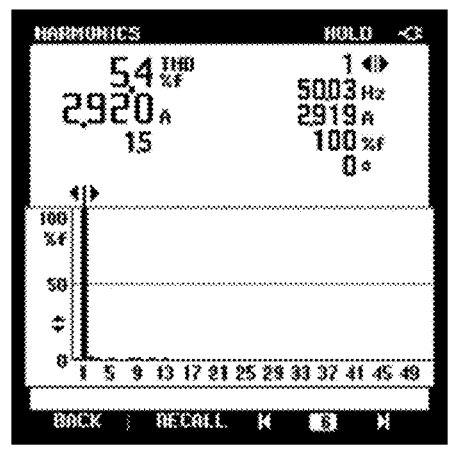

FIGS. 5 and 6 show the dynamic compensation waveforms of load voltage $v_x$, source current $i_{sx}$, and reactive power $Q_{sa}$ of phase a by applying hybrid-STATCOM for inductive load and capacitive load compensation. FIG. 7 provides the corresponding source current harmonic spectrums for inductive and capacitive reactive power compensations.

FIG. 5 clearly shows that after hybrid-STATCOM compensation, the source current $i_{sx}$ and the load voltage $v_x$ are in phase with each other. The source displacement power factors (DPFs) are compensated to 1.00 from the original 0.69 (for inductive loading) and 0.64 (for capacitive loading). The worst phase source current $THD_{isx}$ are 3.5% and 5.4% after compensation, which satisfy the international standard [23] ($THD_{isx}$<15%). The source current $i_{sx}$ are also significantly reduced after compensation. In FIGS. 5a and 5b, the hybrid-STATCOM obtains a good dynamic compensation performance. In FIG. 5c, the response time is longer than expected by one cycle because the inductive loads and capacitive loads are manually switching on and off.

Figure 8:
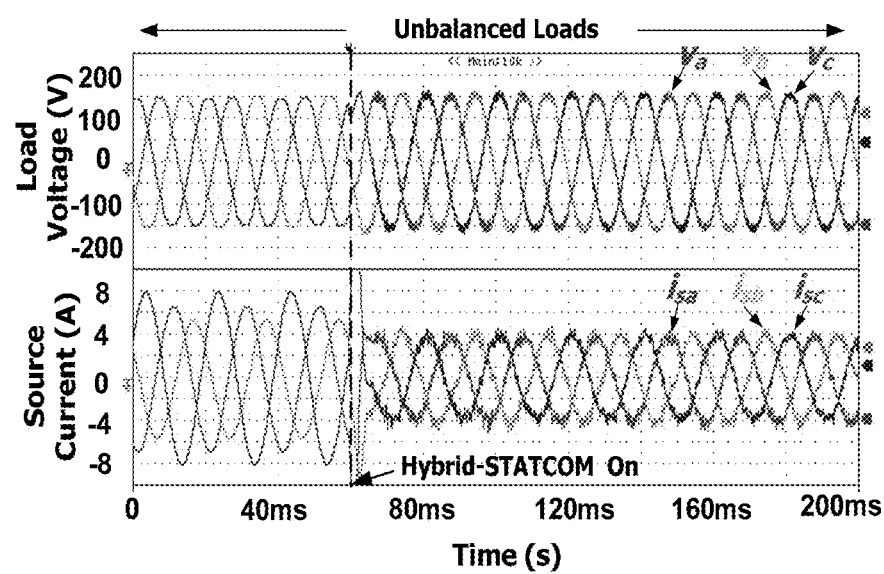
FIG. 8 depicts the dynamic compensation waveforms of $v_x$ and $i_{sx}$ by applying hybrid-STATCOM under unbalanced loads.
Figure 9A:
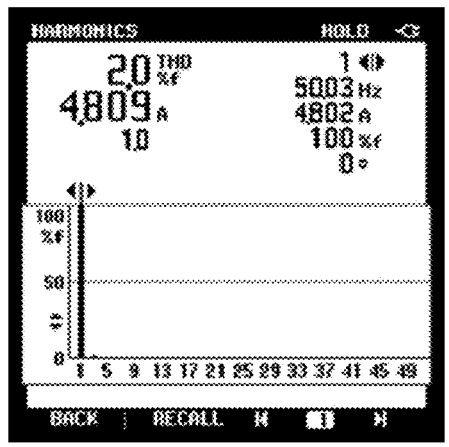
FIG. 9a, FIG. 9b, FIG. 9c, FIG. 9d, FIG. 9e, and FIG. 9f depict the source current harmonic spectrums under unbalanced loads before compensation: (a) phase a, (b) phase b, (c) phase c, and after hybrid-STATCOM compensation: (d) phase a, (e) phase b, (f) phase c respectively.
Figure 9B:
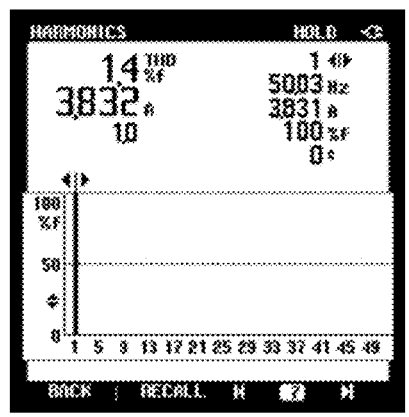
Figure 9C:
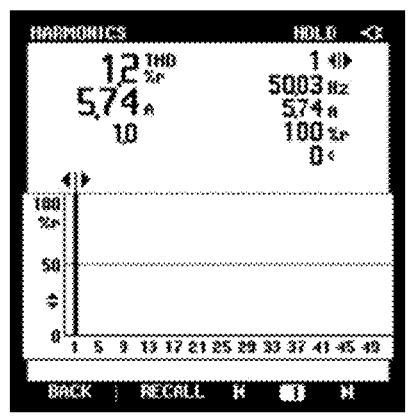
Figure 9D:
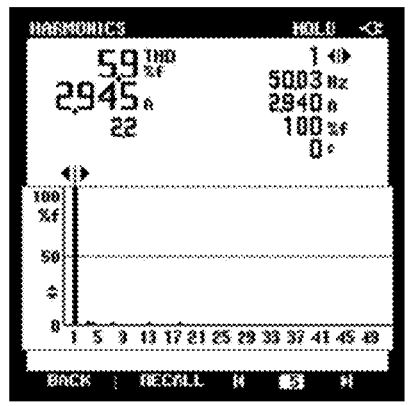
Figure 9E:
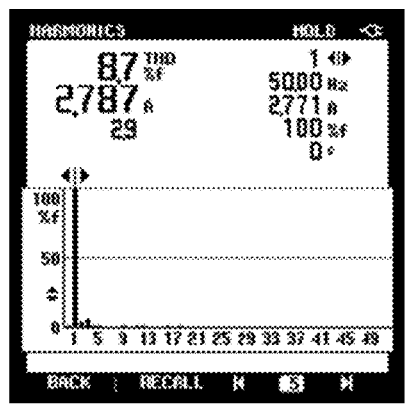
Figure 9F:
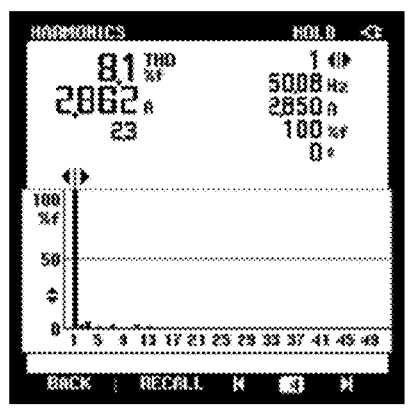
Figure 10:
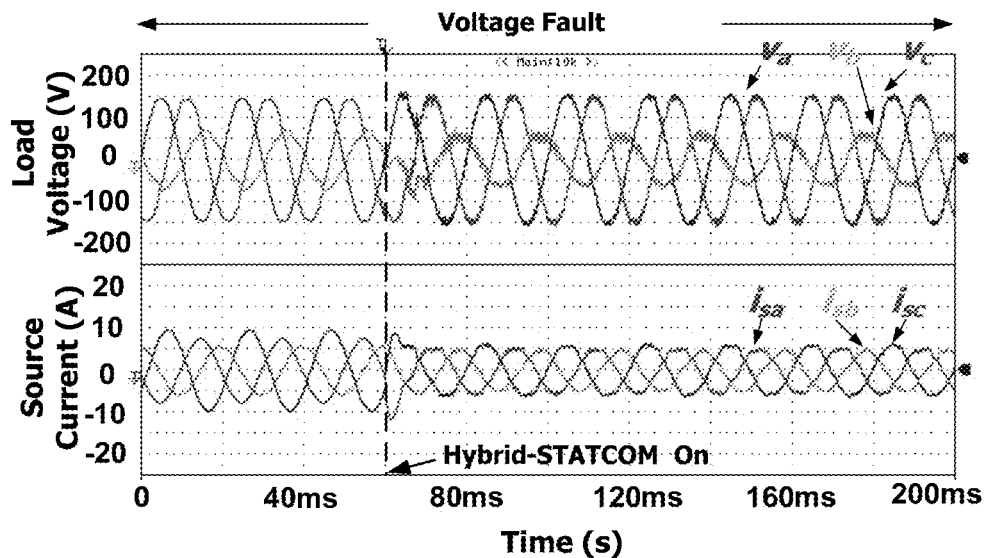
FIG. 10 depicts the dynamic compensation waveforms of $v_x$ and $i_{sx}$ by applying hybrid-STATCOM under voltage fault condition.
Figure 11A:
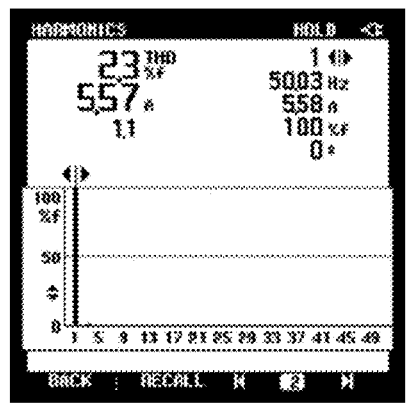
FIG. 11a, FIG. 11b, FIG. 11c, FIG. 11d, FIG. 11e, and FIG. 11f depicts the source current harmonic spectrum under voltage fault before compensation: (a) phase a, (b) phase b, (c) phase c, and after hybrid-STATCOM compensation: (d) phase a, (e) phase b, (f) phase c respectively.
Figure 11B:
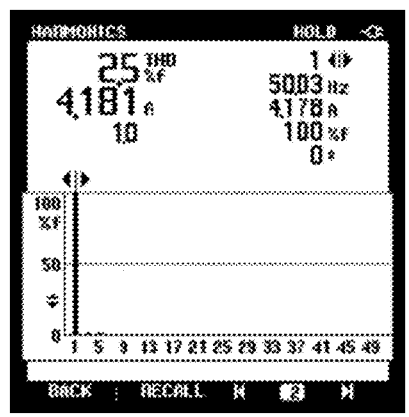
Figure 11C:
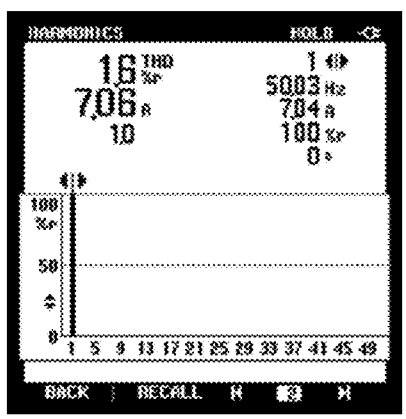
Figure 11D:
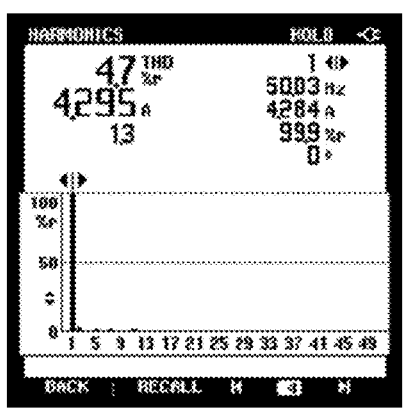
Figure 11E:
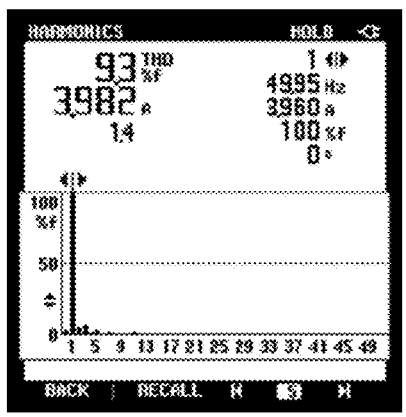
Figure 11F:
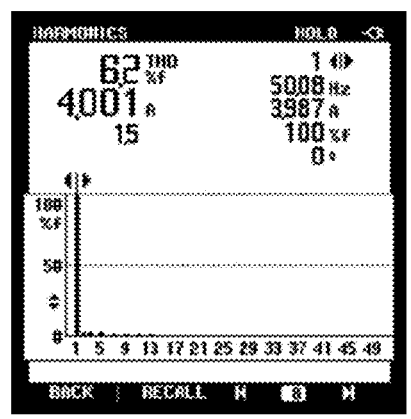

FIGS. 8 and 10 illustrate dynamic compensation waveforms of load voltage $v_x$ and source current $i_{sx}$ by applying hybrid-STATCOM under unbalanced loads and voltage fault situations, which clearly verify its good dynamic performance. FIGS. 9 and 11 provide their corresponding source current harmonic spectrums.

FIGS. 8 and 9 show that the hybrid-STATCOM can compensate for and balance the source current even under unbalanced loads with low $V_{DC}$=50V. The unbalanced $i_{sx}$ are compensated from 4.80 A, 3.83 A, and 5.74 A to 2.94 A, 2.79 A, and 2.86 A, respectively. The DPF and $THD_{isx}$ are compensated to unity and lower than 9.0%, which satisfy the international standard [23]. From FIGS. 10 and 11, it can be seen that the hybrid-STATCOM can still obtain satisfactory performances even under asymmetric grid fault. During the voltage fault, the $i_{sx}$ can be compensated to be approximately balanced with DPF≈1 and $THD_{isx}$<10.0%.

Figure 12:
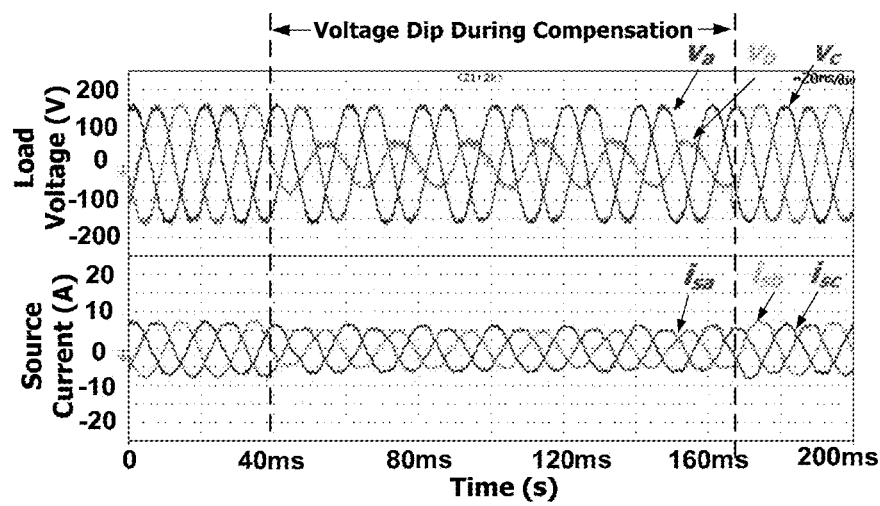
FIG. 12 depicts the dynamic compensation waveforms of $v_x$ and $i_{sx}$ by applying hybrid-STATCOM during voltage dip.

FIG. 12 also provides the dynamic compensation waveforms of load voltage $v_x$ and source current $i_{sx}$ by applying hybrid-STATCOM during a sudden voltage dip. It is found that hybrid-STATCOM can obtain good dynamic and reactive power compensation performances.

Table IV summarizes the hybrid-STATCOM experimental results. The experimental results confirm that the hybrid-STATCOM has a wide reactive power compensation range and low DC-link voltage characteristics with good dynamic performance even under different voltage and current conditions.

TABLE IV

Experimental Compensation Results by Hybrid-STATCOM ($V_{DC}$ = 50 V) under Different System and Loading Situations

| Different Situations | Comp. | $i_{sx}$ (A) | | | DPF | | | $THDi_{sx}$ (%) | | |
|---|---|---|---|---|---|---|---|---|---|---|
| | | A | B | C | A | B | C | A | B | C |
| Inductive load | Before | 7.13 | 7.14 | 7.34 | 0.69 | 0.70 | 0.70 | 1.1 | 1.2 | 1.2 |
| | After | 4.79 | 4.97 | 4.95 | 1.00 | 1.00 | 1.00 | 3.5 | 3.3 | 3.3 |
| Capacitive load | Before | 3.60 | 3.63 | 3.65 | 0.65 | 0.64 | 0.64 | 3.1 | 2.9 | 2.8 |
| | After | 2.92 | 2.80 | 2.85 | 1.00 | 1.00 | 1.00 | 5.4 | 5.4 | 5.2 |
| Unbalanced loads | Before | 4.80 | 3.83 | 5.74 | 0.36 | 0.69 | 0.64 | 2.0 | 1.4 | 1.2 |
| | After | 2.94 | 2.79 | 2.86 | 1.00 | 1.00 | 1.00 | 5.9 | 8.7 | 8.1 |
| Voltage fault | Before | 5.57 | 4.18 | 7.06 | 0.67 | 0.38 | 0.87 | 2.3 | 2.5 | 1.6 |
| | After | 4.30 | 3.98 | 4.00 | 0.99 | 1.00 | 0.99 | 4.7 | 9.3 | 6.2 |

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A hybrid static synchronous compensator (hybrid-STATCOM) system for providing compensating reactive power required by a load in an electricity distribution network, the hybrid-STATCOM system comprising:
a thyristor-controlled LC (TCLC) part for each electric power phase in the electricity distribution network, each TCLC part comprising:
a coupling inductor;
a power filter capacitor; and
a thyristor-controlled reactor connected in series with a power filter inductor;
wherein the power filter capacitor is connected in parallel with the thyristor-controlled reactor connected in series with the power filter inductor; and
wherein the coupling inductor is connected in series with the parallel-connected power filter capacitor and thyristor-controlled reactor connected in series with the power filter inductor;
and
an active inverter part comprising:
a voltage source inverter for each electric power phase in the electricity distribution network; and
a DC-link capacitor connected in parallel with the voltage source inverters.

2. The hybrid-STATCOM system of claim 1,
wherein the thyristor-controlled reactor is a pair of bidirectional switches;
wherein when the thyristor-controlled reactor is switched off, the TCLC part for each electric power phase in the electricity distribution network comprises a coupling inductor connected in series with a power filter capacitor; and
wherein when the thyristor-controlled reactor is switched on, the TCLC part for each electric power phase in the electricity distribution network comprises a coupling inductor connected in series with a combination of a power filter capacitor and a power filter inductor.

3. The hybrid-STATCOM system of claim 1,
wherein the compensating reactive power required by the load for the electric power phase x, $Q_{cx,TCLC}(a_x)$, is provided by the TCLC part and is governed by:

$$Q_{cx,TCLC}(\alpha_x) = \frac{V_x^2}{X_{TCLCx}(\alpha_x)};$$

wherein $V_x$ is a RMS value of the load voltage and $X_{TCLCx}(a_x)$ is the TCLC part impedance as controllable by firing angle, $a_x$.

4. The hybrid-STATCOM system of claim 3,
wherein the TCLC part impedance, $X_{TCLCx}(a_x)$, is governed by:

$$X_{TCLCx}(\alpha_x) = \frac{\pi X_{L_{PF}} X_{C_{PF}}}{X_{C_{PF}}(2\pi - 2\alpha_x + \sin 2\alpha_x) - \pi X_{L_{PF}}} + X_{L_c};$$

wherein $X_{L_c}$, $X_{L_{PF}}$, and $X_{C_{PF}}$ are fundamental impedances of the coupling inductor, the power filter inductor, and the power filter capacitor, respectively.

5. The hybrid-STATCOM system of claim 3,
wherein a minimum TCLC part inductive impedance and in turn a maximum inductive compensating reactive power are provided by setting $a_x$ to 90°; and
wherein a minimum TCLC part capacitive impedance and in turn a maximum capacitive compensating reactive power are provided by setting $a_x$ to 180°.

6. The hybrid-STATCOM system of claim 1, wherein the active inverter part is configured to limit a compensating current to a reference compensating current value via pulse width modulation (PWM) triggering signals driving one or more switching devices in the active inverter part.

7. The hybrid-STATCOM system of claim 1, wherein the power filter capacitor is determined by:

$$C_{PF} = \frac{Q_{Lx(MaxInd)}}{\omega^2 Q_{Lx(MaxInd)} L_c + \omega V_x^2};$$

wherein $C_{PF}$ is the power filter capacitor capacitance, $\omega$ is a fundamental angular frequency, $V_x$ is a RMS voltage value of the load, $L_c$ is the coupling inductor inductance, $Q_{Lx(MaxInd)}$ and $Q_{Lx(MaxCap)}$ are loading maximum inductive and capacitive reactive power respectively.

8. The hybrid-STATCOM system of claim 1, wherein the power filter inductor is determined by:

$$L_{PF} = \frac{V_x^2 + \omega L_c Q_{Lx(MaxCap)}}{-\omega Q_{Lx(MaxCap)} + \omega^3 L_c C_{PF} Q_{Lx(MaxCap)} + \omega^2 V_x^2 C_{PF}};$$

wherein $L_{PF}$ is the power filter inductor inductance, $\omega$ is a fundamental angular frequency, $V_x$ is a RMS voltage value of the load, $L_c$ is the coupling inductor inductance, $Q_{Lx(MaxInd)}$ and $Q_{Lx(MaxCap)}$ are loading maximum inductive and capacitive reactive power respectively.

9. The hybrid-STATCOM system of claim 1, wherein the coupling inductor is determined by:

$$L_c \geq \frac{V_{DC}}{8 \cdot f_s \cdot \Delta i_{L_c max}};$$

wherein $L_C$ is the coupling inductor inductance, $f_s$ is a switching frequency of the active inverter part, $\Delta i_{LCmax}$ is a maximum allowed output current ripple value, and $V_{DC}$ is a DC-link voltage across the DC-link capacitor.

10. The Hybrid-STATCOM system of claim 1, wherein $V_{DC}$ of the active inverter part is determined by $$V_{DCx} = \sqrt{6}\, V_x \left| 1 + \frac{Q_{Lx}}{Q_{cx,TCLC}(\alpha_x)} \right|$$

$$V_{DC} = \max(V_{DCa}, V_{DCb}, V_{DCc})$$

wherein x is a, b or c, $V_{DCx}$ is the required DC-link voltage of each phase, $Q_{Lx}$ is the reactive power of the loading, $Q_{cx,TCLC}(a_x)$ is the reactive power provided by the TCLC part, $V_x$ is the RMS phase load voltage and the final $V_{DC}$ is determined by choosing the largest DC voltage among phase a, b and c.

11. The hybrid-STATCOM system of claim 1, wherein the TCLC part is configured to compensate the load reactive power with the TCLC part impedance;
wherein the TCLC part impedance required is determined by:

$$X_{TCLCx} = \frac{V_x}{I_{Lqx}} = \frac{\|v\|^2}{\sqrt{3}\, \bar{q}_{Lx}};$$

wherein $X_{TCLCx}$ is an instantaneous value of the TCLC part impedance in each phase, $\|v\|$ is a norm of three phase instantaneous voltage of the load, and $\bar{q}_{Lx}$ is a DC component of the phase reactive power of the load, and x is a, b or c;
wherein $\|v\|$ is obtained by:

$$\|v\| = \sqrt{v_a^2 + v_b^2 + v_c^2}\,;$$

wherein $v_a$, $v_b$, and $v_c$ are the three phases instantaneous voltage of the load;
wherein $\bar{q}_{Lx}$ is obtained by:

$$\begin{bmatrix} q_{La} \\ q_{Lb} \\ q_{Lc} \end{bmatrix} = \begin{bmatrix} v_b \cdot i_{Lc} - v_c \cdot i_{Lb} \\ v_c \cdot i_{La} - v_a \cdot i_{Lc} \\ v_a \cdot i_{Lb} - v_b \cdot i_{La} \end{bmatrix};$$

and
wherein $q_{La}$, $q_{Lb}$, and $q_{Lc}$ are the three phase reactive power of the load.

12. The hybrid-STATCOM system of claim 11, wherein the impedance of the TCLC part is controllable by selecting a firing angle;
wherein the firing angle is determined by solving:

$$X_{TCLCx}(\alpha_x) = \frac{X_{TCR}(\alpha_x) X_{C_{PF}}}{X_{C_{PF}} - X_{TCR}(\alpha_x)} + X_{L_c} = \frac{\pi X_{L_{PF}} X_{C_{PF}}}{X_{C_{PF}}(2\pi - 2\alpha_x + \sin 2\alpha_x) - \pi X_{L_{PF}}} + X_{L_c};$$

and
wherein $a_x$ is the firing angle, $X_{L_c}$, $X_{L_{PF}}$, and $X_{C_{PF}}$ are fundamental impedances of the coupling inductor, the power filter inductor, and the power filter capacitor respectively.

13. The hybrid-STATCOM system of claim 12, further comprising a look-up table (LUT) between $X_{TCLCx}$ and $a_x$ for determining the firing angle for the TCLC part impedance required;
wherein the control of the TCLC part impedance is triggered by comparing the firing angle with the load voltage phase angle.

14. The hybrid-STATCOM system of claim 1, wherein the active inverter part is configured to limit a compensating current to a reference compensating current value to avoid mistuning problem, resonance problem, and harmonic injection problem in the TCLC part under different voltage and current conditions;
wherein the reference compensating current value is determined by:

$$\begin{bmatrix} i_{ca}^* \\ i_{cb}^* \\ i_{cc}^* \end{bmatrix} = \sqrt{\frac{2}{3}} \cdot \begin{bmatrix} 1 & 0 \\ -1/2 & \sqrt{3}/2 \\ -1/2 & -\sqrt{3}/2 \end{bmatrix} \cdot \begin{bmatrix} \cos\theta_a & -\sin\theta_a \\ \sin\theta_a & \cos\theta_a \end{bmatrix} \cdot \begin{bmatrix} \tilde{i}_d \\ i_q \end{bmatrix};$$

wherein $i_{ca}^*$, $i_{cb}^*$, and $i_{cc}^*$ are the three phases reference compensating current values, $i_d$ and $i_q$ are instantaneous active and reactive current respectively, which include DC components $\bar{i}_d$ and $\bar{i}_q$, and AC components $\tilde{i}_d$ and $\tilde{i}_q$;
wherein $\tilde{i}_d$ is obtained by passing $i_d$ through a high-pass filter;
wherein $i_d$ and $i_q$ are obtained by:

$$\begin{bmatrix} i_d \\ i_q \end{bmatrix} = \begin{bmatrix} \cos\theta_a & \sin\theta_a \\ -\sin\theta_a & \cos\theta_a \end{bmatrix} \cdot \begin{bmatrix} i_\alpha \\ i_\beta \end{bmatrix}$$

and $$\begin{bmatrix} i_\alpha \\ i_\beta \end{bmatrix} = \begin{bmatrix} 1 & -1/2 & -1/2 \\ 0 & \sqrt{3}/2 & -\sqrt{3}/2 \end{bmatrix} \cdot \begin{bmatrix} i_{La} \\ i_{Lb} \\ i_{Lc} \end{bmatrix};$$

wherein $i_{La}$, $i_{Lb}$, and $i_{Lc}$ are the three phases load current; and
wherein the active inverter part is further configured to limit the compensating current to the reference compensating current value via pulse width modulation (PWM) triggering signals driving one or more switching devices in the active inverter part.

* * * * *